Dec. 29, 1936.  J. A. LUKE  2,066,046
AUXILIARY HUB DEVICE
Filed Jan. 26, 1935
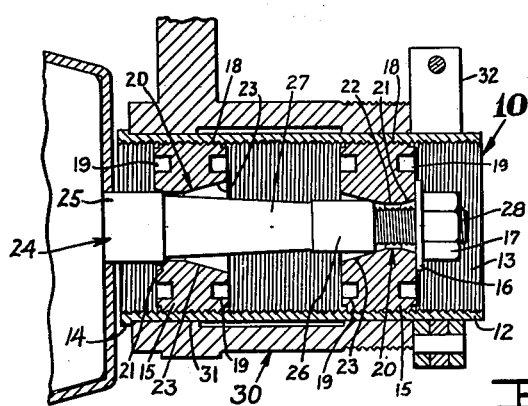
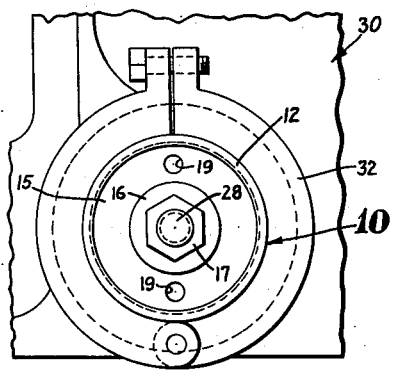
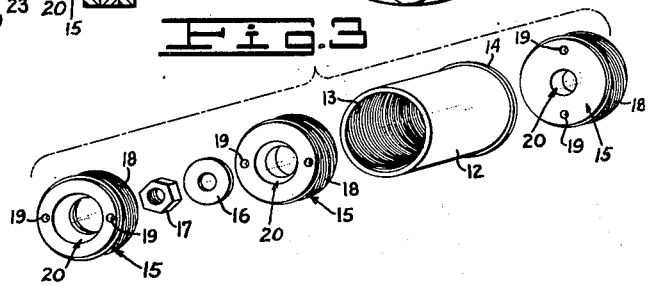
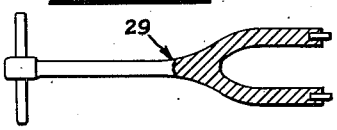
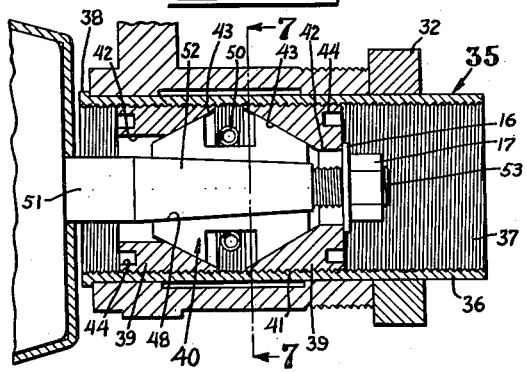
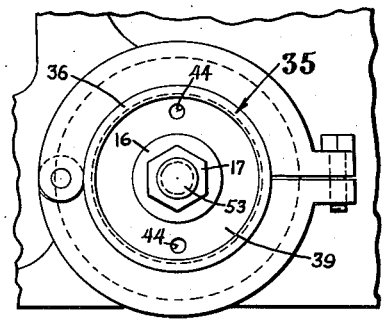
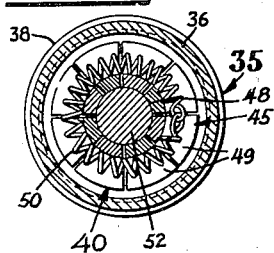
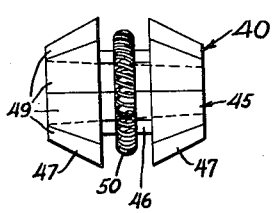
INVENTOR.
JOHN A. LUKE.
BY
B. J. Craig
ATTORNEY.

Patented Dec. 29, 1936

2,066,046

UNITED STATES PATENT OFFICE 2,066,046

AUXILIARY HUB DEVICE

John A. Luke, Whittier, Calif.

Application January 26, 1935, Serial No. 3,587

2 Claims. (Cl. 287—53)

This invention relates to improvements in auxiliary hubs.

The general object of the invention is to provide an improved hub member adapted to be secured to an automobile axle for mounting thereon a mechanism for trimming brake bands, etc.

Other objects and the advantages of this invention will be apparent from the following description taken in connection with the accompanying drawing wherein:

Fig. 1 is a longitudinal section through my auxiliary hub device showing it operatively mounted on an axle of an automobile;

Fig. 2 is an end view of the device shown in Fig. 1;

Fig. 3 is an extended perspective view of the various parts of my auxiliary hub on a reduced scale;

Fig. 4 is a side elevation partly in section of the tool used in connection with the auxiliary hub;

Fig. 5 is a longitudinal section through a modified form of auxiliary hub showing it operatively mounted on the axle of an automobile;

Fig. 6 is an end view of the device shown in Fig. 5;

Fig. 7 is a section taken on line 7—7 of Fig. 5; and,

Fig. 8 is a side elevation of the gripping member shown in Fig. 5.

Referring to the drawing by reference characters I have indicated my improved auxiliary hub generally at 10. As shown the hub 10 includes a cylindrical sleeve 12 which is internally threaded throughout its length as indicated at 13. Adjacent one end the sleeve 12 includes an enlarged annular flange portion 14.

With each hub I preferably furnish three gripping collars 15, a washer 16 and a nut 17, as shown in Fig. 3. Each of the collars 15 is externally threaded as indicated at 18 to match the threads 13 of the sleeve 12 and each face of the collars has a plurality of wrench engaging recesses 19 therein. Each of the collars has an aperture 20 therethrough which at one end includes a short outwardly tapered portion 21, then a short cylindrical portion 22 and then a long tapered portion 23. The aperture 20 is of different diameter in each of the collars 15.

In Fig. 1 I have shown my auxiliary hub device 10 operatively mounted on a standard automobile axle indicated generally at 24. The axle 24 adjacent the body of the automobile includes a cylindrical bearing portion 25 and a reduced cylindrical bearing portion 26 adjacent the opposite end with a tapered portion 27 between the bearing portions 25 and 26. Extending outward from the portion 26 the axle 24 includes a reduced threaded shank portion 28.

In operation one of the collars 15 is threaded into the sleeve 12 adjacent the flange end of the sleeve and then another of the collars 15 having a smaller aperture therein is threaded into the sleeve from the opposite end. A tool such as indicated at 29 in Fig. 4 may be used to rotate the collars 15 as they are threaded into the sleeve.

The sleeve is then positioned over the axle 24 with the flange 14 adjacent the inner end of the axle and with the axle positioned in the apertures 20 of the collars 15.

The sleeve 12 is moved towards the inner end of the axle until the inwardly facing tapered portion of the aperture 20 in the inner collar engages the shoulder at the juncture of the axle bearing portion 25 and the tapered portion 27. Then the outer collar is threaded further into the sleeve until the inwardly facing tapered portion of its associated aperture 20 engages the shoulder at the juncture of the axle bearing portion 26 and the reduced threaded shank 28. Thereafter the washer 16 is placed on the shank 28 and then the nut 17 is threaded onto the shank and turned up tight against the washer 16 which abuts the face of the outer collar.

A suitable brake lining truing mechanism or other tool such as indicated at 30 and having an aperture 31 therein is mounted then on the sleeve 12 with the sleeve 12 positioned in the aperture 31. A clamping collar such as indicated at 32 may if desired be mounted on the sleeve 12 to restrict movement of the tool 30 axially on the sleeve.

In Figs. 5 to 8, inclusive, I have indicated a modified form of my invention generally at 35. As shown the hub device 35 includes a cylindrical sleeve 36 internally threaded throughout its length as indicated at 37 and having an enlarged flange portion 38 adjacent one end thereof. The hub device 35 further includes a pair of collars 39 and a gripping member 40 which is shown in detail in Fig. 8.

Each of the collars 39 is externally threaded as indicated at 41 to match the threads 37 of the sleeve and has a coaxial aperture 42 therethrough which includes an outwardly inclined portion 43 adjacent one end. The face of each collar opposite the inclined portion of the aperture has a plurality of wrench receiving recesses 44 therein.

The gripping member 40 as a whole comprises a body portion 45 which includes a cylindrical shank portion 46 having enlarged frusto-conical flange portions 47 at each end with the bosses thereof adjacent the shank. The body 45 has a coaxial tapered aperture 48 therethrough. After the body 45 is bored and shaped to form the shank and the conical end flanges it is longitudinally equally divided as by sawing into a plurality of segments, as indicated by 49.

Thereafter an endless resilient member such as a coiled spring 50 is positioned on the shank portion 46.

As shown in Fig. 5 the hub device 35 is adapted to be mounted on an automobile axle 51 which includes a tapered portion 52 and a reduced threaded shank portion 53.

In operation one of the collars 39 is threaded into the sleeve 36 adjacent the flange end thereof with the tapered portion of the collar facing towards the plane end of the sleeve. The sleeve is then positioned on the axle with the flange end thereof towards the inner end of the axle and with the axle positioned in the aperture of the collar. Then the gripping member 40 is positioned on the tapered portion 52 of the axle and the other collar threaded into the sleeve with the tapered portion of its associated aperture facing inward.

The second or outer collar is then threaded into the sleeve until it engages the outer conical flange 47 of the gripping member. Upon further inward movement of the outer collar the tapered portions 43 of the collars firmly engage the conical flanges of the gripping member and securely clamp the gripping member to the axle.

The tool 30, previously described, may then be mounted on the hub device 35 with the sleeve 36 positioned in the aperture 31 and then the clamping collar may be secured to the sleeve, if desired.

From the foregoing description it will be apparent that I have provided a novel auxiliary hub which is simple in construction and highly efficient in use.

Having thus described my invention, I claim:

1. The combination with an axle having a threaded end portion and having thereon a pair of spaced cylindrical portions of different diameters, of an auxiliary hub device, said device including a sleeve member internally threaded, a pair of collar members in said sleeve, said collars being externally threaded to match the threads of said sleeve, said collars each having an aperture therein and said apertures each including an outwardly tapered portion adjacent each end, said auxiliary hub device being positioned on said axle with said axle positioned in the apertures of said collars, one of said tapered portions of the aperture of one of said collars engaging one of said cylindrical portions of said axle, the tapered portions of the other collar engaging the other cylindrical portion of said axle and a nut on said threaded end portion of said axle, said nut being adapted to hold the auxiliary hub on the axle.

2. The combination with an axle having a pair of spaced aligned bearing portions thereon and having its outer end terminating in an externally threaded portion, of an auxiliary hub device, said device including a sleeve member internally threaded, a pair of spaced collars positioned in said sleeve, said collars each having a tapered aperture therethrough, each of said collars being disposed on one of said bearing portions; a washer about said threaded portion of said axle, and a nut on said threaded portion engaging said washer and adjustably retaining said auxiliary hub device on said axle.

JOHN A. LUKE.